United States Patent [19]

Nakata et al.

[11] 4,442,337

[45] Apr. 10, 1984

[54] METHOD AND SYSTEM FOR DUAL CONTROL OF RESISTANCE WELDING

[75] Inventors: Shuji Nakata, Toyonaka; Yoshio Kawaguchi, Yokohama; Akira Nishimura, Yokosuka, all of Japan

[73] Assignee: Nissan Motor Company, Limited, Kanagawa, Japan

[21] Appl. No.: 256,244

[22] Filed: Apr. 21, 1981

[30] Foreign Application Priority Data

Apr. 21, 1980 [JP] Japan .................................. 55-51684
Jan. 30, 1981 [JP] Japan .................................. 56-11627

[51] Int. Cl.³ ............................................. B23K 11/24
[52] U.S. Cl. .............................. 219/117.1; 219/86.41; 219/110; 219/114
[58] Field of Search ............ 219/110, 108, 114, 117.1, 219/86.41

[56] References Cited

U.S. PATENT DOCUMENTS

| | | | |
|---|---|---|---|
| 2,848,595 | 8/1958 | Van Sciver | 219/110 |
| 3,068,350 | 12/1962 | Archer | 219/110 |
| 3,149,221 | 9/1964 | Watter et al. | 219/110 |
| 3,654,424 | 4/1972 | Vanderheist | 219/110 |

FOREIGN PATENT DOCUMENTS

| | | |
|---|---|---|
| 2346561 | 7/1975 | Fed. Rep. of Germany . |
| 1177987 | 1/1970 | United Kingdom . |
| 590107 | 1/1978 | U.S.S.R. ............................. 219/110 |

Primary Examiner—C. C. Shaw
Attorney, Agent, or Firm—Lowe, King, Price & Becker

[57] ABSTRACT

A method and system for controlling resistance welding whereby the preferred quality of resistance welding can be ensured automatically during the welding process by controlling the electrode pressure so that the electrode resistance changes in accordance with a reference resistance curve, or by additionally controlling the electrode voltage so that the electrode voltage changes in accordance with a reference voltage curve. The system according to the present invention comprises an electrode voltage sensor, an electrode current sensor, a reference resistance generator, a reference voltage generator, a differential amplifier, a pressure control device, a current controller and so on.

41 Claims, 15 Drawing Figures

METHOD AND SYSTEM FOR DUAL CONTROL OF RESISTANCE WELDING

BACKGROUND OF THE INVENTION

1. Field of the Invention

The present invention relates to a method and system for controlling resistance welding, and more specifically to a method and system of controlling the pressure applied to the electrodes or the current passed therethrough by detecting the resistance between the electrodes or the voltage therebetween, respectively, in order to obtain a stable quality during the welding process.

2. Description of the Prior Art

In conventional resistance welding, for instance spot welding, generally the welding conditions between two members to be welded are largely dependent upon the electrode pressure, the sizes and shapes of the electrodes, the condition of the electrodes, and the kinds or worked conditions of the members to be welded. Therefore, it is impossible to attain a stable welding quality even if the electrode pressure, welding current, and welding time are all maintained at constant levels. In this case, the term "electrode pressure" refers to the pressure applied between the electrodes pinching together two or more members to be welded.

To overcome this problem, conventionally there have been devised various testing systems for monitoring the electrode voltage, the electrode resistance and so on, and other systems for monitoring the welds by means of ultrasonic waves. These monitoring methods or apparatuses, although being applied in various fields, can only determine whether or not the quality of the welded portions is satisfactory after the welding process has been completed, and therefore cannot ensure the quality of the welding during the welding process.

In this case, the term "quality of weld" implies the size and penetration of the beads formed at the welds, the tensile and shear strengths of the welds, and so on.

Therefore, even when the various conventional methods or systems for resistance welding are used separately or together, the welding quality is poor; and it is necessary to correct or repair the weld, or to discard the parts or weldments in the case where the weld quality is beyond repair.

The inventors have already proposed a method of controlling resistance welding in such a manner that the quality of resistance welding can be ensured automatically during the welding process by controlling the electrode pressure or both the electrode pressure and the welding current so that the electrode voltage changes in accordance with a reference voltage curve predetermined to ensure a desirable welding quality. This idea depends upon the fact that the welding voltage applied between two electrodes between which the members to be welded are pinched (including the electrode tips in the case of spot welding) has a close relationship to the quality of the welding.

However, it is impossible to control the size of a bead formed at the weld under optimum conditions at all times depending only upon the method described above. For instance, when the electrode tip is crushed, the diameter of the bead becomes excessively large, thus resulting in excessive power consumption and producing an unnecessarily good quality. On the other hand, there sometimes arises another problem such that it is impossible to obtain the necessary diameter of the bead, even when the elctrode voltage is altered according to the reference voltage curve. This is because the area through which the welding current is passed is not sufficient because of the surface conditions between the members to be welded together.

In order to perform such a resistance welding control, it is necessary to predetermine the reference welding current so that the resistance and voltage between the electrodes pinching the members to be welded together roughly coincides with the predetermined reference values, to control the welding pressure applied to the electrodes in accordance with the difference in resistance between the detected value and the reference value, and also to correct the welding current in accordance with the difference in voltage between the detected value and the reference value.

However, when the power supply voltage fluctuates, since the reference welding current also fluctuates even if the other conditions are kept constant, the control characteristics will deteriorate. Especially when the power supply voltage fluctuates greatly, the response in control of the electrode voltage is slow, and therefore it is impossible to obtain the desired results.

SUMMARY OF THE INVENTION

With these problems in mind, therefore, it is the primary object of the present invention to provide a method and system of controlling resistance welding whereby the preferred quality of resistance welding can be ensured automatically at all times under optimum conditions during the welding process.

To achieve the above-mentioned object, the pressure applied between the electrodes is controlled so that the resistance between the electrodes pinching the members to be welded together coincides with the welding resistance based on a reference resistance curve during the welding process, that is, while the current is being passed therethrough. Additionally the welding current is first controlled so that the voltage between the electrodes changes in accordance with a reference voltage curve, or so that the integral of the difference between the electrode voltage in excess of a predetermined base voltage and the predetermined base voltage changes in accordance with a reference voltage integration curve, and is then automatically cut off when the integral of the difference in voltage reaches the reference value.

In addition to the above-mentioned control of the welding pressure and current, the control characteristics can further be improved by the steps of comparing the instantaneous power supply voltage with a standard power supply voltage, and by controlling a firing phase angle signal applied to a welding current phase controller according to the difference in voltage between the two, to retain the reference welding current at a constant level even if the supply voltage fluctuates.

To achieve the above-mentioned objects, the system of controlling resistance welding according to the present invention comprises a voltage sensor, a current sensor, a peak voltage holding circuit, a peak current holding circuit, a resistance calculation circuit, a differential amplifier, a reference resistance generator and a pressure control device.

Additionally, the system could comprise another peak voltage holding circuit, another differential amplifier, another calculation circuit, another differential amplifier, a memory, and a reference voltage generator, where necessary.

Further, in another embodiment the system comprises an integrator/adder and a base voltage presetting circuit.

Further, in yet another embodiment the system comprises an integral comparator and a reference integral generator.

Moreover, the system could comprise a standard supply voltage setting circuit, another differential amplifier, a reference current setting circuit, an adder/amplifier and so on to control the power supply voltage.

BRIEF DESCRIPTION OF THE DRAWINGS

The features and advantages of the method and system of resistance welding according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Prior to the detailed description of the preferred embodiments according to the present invention, a description will be made hereinbelow of graphical representations showing the fundamental characteristics obtained by various experiments on resistance welding.

The resistance between electrodes pinching members to be welded has a close relationship to the area between which the members to be welded are in contact with each other, that is, the area through which the welding current is flowing. This current path area at the weld during the welding process can be determined by the welding resistance between the electrodes.

Also, since the voltage between the electrodes has a close relationship to the rise in temperature of the weld portion, it is possible to determine the electrode voltage curve with respect to time according to the kinds, shapes, and thicknesses of the members to be welded, and therefore it is possible to obtain an optimum electrode voltage curve giving good weld penetration.

Further, the effective electrode voltage is a voltage above a predetermined base voltage, and the integral of voltage above this predetermined base voltage and the consequent change in welding time have a great effect upon the quality of the weld.

The present invention is based upon the results of the experiments described above. In other words, the present invention provides a method of controlling resistance welding in such a manner that the preferred quality of resistance welding can be ensured automatically at all times during the welding process according to changes in welding conditions such as the contact conditions of members to be welded, the condition of the electrode tips, and so on.

In view of the above description, reference is now made to FIGS. 1 to 6.

Figure 1:
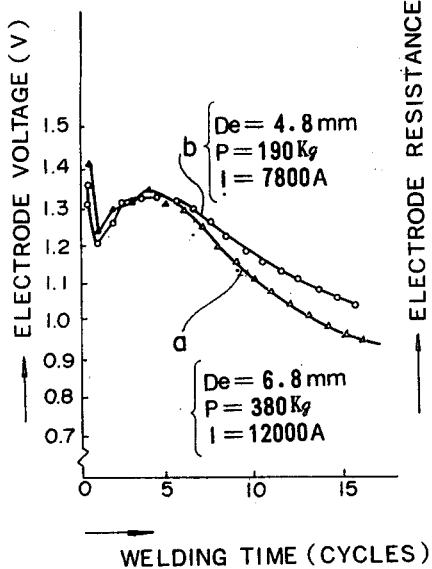
FIG. 1 is a graphical representation of typical relationships between electrode voltage and welding time for the case where two mild-steel plates are spot-welded.

FIG. 1 shows typical relationships between the voltage between the electrode tips and the welding time (hereinafter referred to simply as a "voltage curve"). Now, if De denotes the mean diameter of the contact between the electrode tip and the member to be welded (hereinafter referred to simply as an "electrode tip diameter"), P denotes the pressure applied between the electrodes, and I denotes the welding current, the curve a shows the case where De is 6.8 mm, P is 380 kg, and I is 7800 A, and the curve b shows the case where De is 4.8 mm, P is 190 kg, and I is 7800 A. The welding time is shown by the number of cycles of the alternating current passed therethrough.

As is well understood, FIG. 1 indicates that there is no great difference in the electrode voltage between the curves a and b even when the electrode tip diameter differs greatly.

Figure 2:
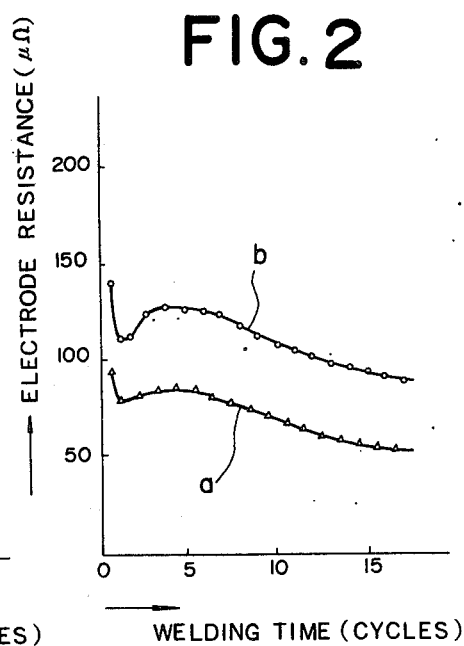
FIG. 2 is a graphical representation of typical relationships between electrode resistance and welding time for the same case as in FIG. 1.

FIG. 2 shows typical relationships between the resistance between the electrodes and the welding time (hereinafter referred to simply as a "resistance curve"), where the welding conditions are the same as in FIG. 1.

As is well understood, FIG. 2 indicates that the difference in electrode tip diameter exerts a great influence upon the electrode resistance, and the greater the electrode tip diameter, the smaller the electrode resistance (the electrode resistances on the curve a are smaller than those on curve b).

Figure 3:
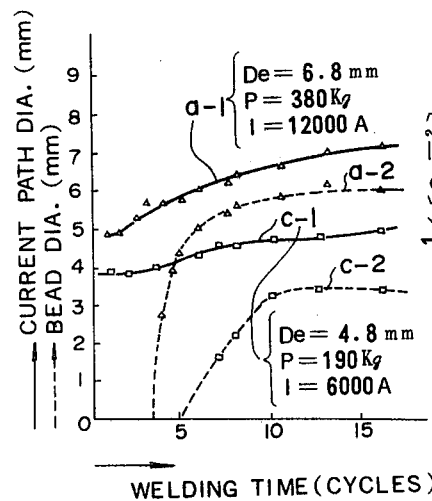
FIG. 3 is a graphical representation of relationships between current path dimension and welding time and between bead diameter and welding time for the same case as in FIG. 1.

FIG. 3 shows typical relationships between the diameter of the area through which the welding current is passed to the members to be welded (hereinafter referred to as "current path diameter") and welding time (solid lines) and the diameter of bead formed and welding time (dashed lines). The curve a-1 shows the relationship between the current path diameter and welding time where De is 6.8 mm, P is 380 kg, and I is 12000 A. The curve a-2 shows the relationship between bead diameter and welding time under the same conditions as in the curve a-1. The curve c-1 shows the relationship between current path diameter and welding time where De is 4.8 mm, P is 190 kg, and I is 6000 A. The curve c-2 shows the relation between bead diameter and welding time under the same conditions as in the curve c-1.

FIG. 3 indicates that in the state where a bead is formed there is a close relationship between bead diameter and current path diameter, and these are greatly affected by the diameter of the electrode tip.

Figure 4:
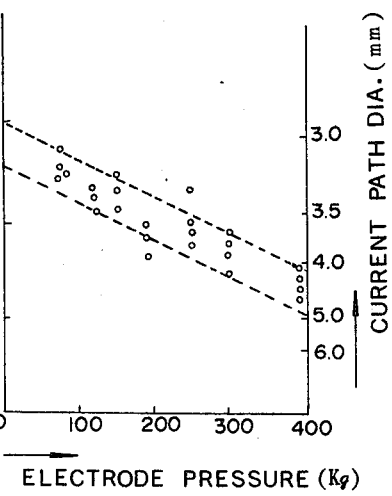
FIG. 4 is a graphical representation of relationships between current path diameter and electrode pressure.

FIG. 4 shows the relationship between electrode pressure and current path diameter or the reciprocal of the current path area 1/S when an initial welding current is passed therethrough (during one cycle after the current is initially passed).

FIG. 4 indicates that there is a relationship between electrode pressure and current path diameter within a dispersion range. This also indicates the fact that it is possible to control the current path area at the initial current flow by controlling the electrode pressure.

Figure 5:
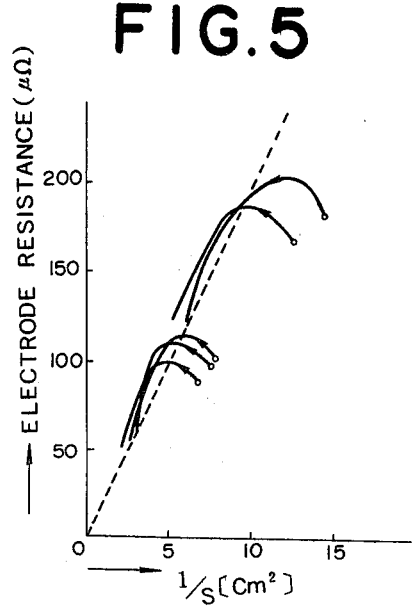
FIG. 5 is a graphical representation of typical relationships between electrode resistance during welding process under various welding conditions and the reciprocal of the current path area.

FIG. 5 shows the variation in time of the relationship between electrode resistance and the reciprocal of current path area 1/S while the welding current is being passed therethrough under various welding conditions where the shapes and sizes of electrode tip, electrode pressures, electrode currents, etc. are all different from each other. The electrode resistance changes continuously during the welding process, and the direction of the arrows in FIG. 5 indicates the direction in which time elapses.

FIG. 5 indicates that the electrode resistance is approximately proportional to the reciprocal of the current path area after having passing through a maximum point thereof, and approaches the same straight line, as shown by the dashed line in FIG. 5, under any welding conditions.

Figure 6:
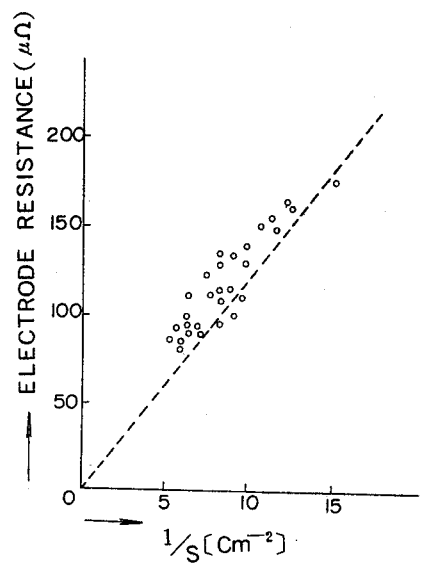
FIG. 6 is a graphical representation of typical relationships between electrode resistance at the start of current flow under various welding conditions and the reciprocal of the current path area.

FIG. 6 shows the relationship between the electrode resistance when the initial welding current is passed therethrough and the reciprocal of the current path area 1/S under various welding conditions.

FIG. 6 also indicates, as in FIG. 5, that there is a proportional relationship between the two roughly along the straight dashed line shown.

This relationship can readily be understood by the fact that electrode resistance R is given by $R = p \cdot l/S$, where p is the specific resistance of members to be welded, l is the distance between the electrodes, and S is the current path area of the members to be welded together.

These facts also indicate that it is possible to estimate the current path area of the members to be welded during the welding process by measuring the electrode resistance.

In this case, even if there is another welded point near the weld in question, it is possible to estimate the current path area, within almost the same error, depending upon the electrode resistance.

Further, the voltage and resistance between the welding electrodes include the voltage and resistances between each electrode tip and the equivalent member to be welded, in addition to the values between the two members to be welded; however since the former is generally as small as 20–30 percent of the latter and is approximately constant with respect to welding time, it is possible to regard the electrode voltage and resistance simply as the values between the two members to be welded, disregarding the other values.

The above-mentioned facts are true regardless of the shapes and sizes of the electrode tips or the kinds of members being welded.

In addition, there is no fundamental change in the tendency even if the thickness or number of members to be welded differ.

Accordingly, it is possible to detect the area through which the welding current is passed between materials to be welded by detecting the resistance between electrodes during the welding process.

Since the current path area has a close relationship to the size of the bead formed, it is possible to obtain a desired diameter of the bead at the weld first by predicting a reference resistance curve by which a desired bead diameter can be obtained, that is the desired current path area can be obtained, and next by controlling the electrode pressure instantaneously or at a predetermined special point of time so that the electrode resistance coincides with the resistance on the reference curve while the current is flowing therethrough.

In this case, it is possible to control the current path area by changing the electrode pressure, even if the electrode tip is greatly distorted because of crushing due to pressure. In addition, it is possible to control the current path area even when the contact conditions at the weld are not stable, for instance when the members to be welded are parts manufactured by pressing processes.

Further, since it has been clarified that it is possible to check the heat condition between members being welded, that is, the rate of bead formation depending upon the electrode voltage, in addition to the above-mentioned control of electrode pressure while the current is flowing therethrough, it is possible to obtain a further reliable desired quality of weld by controlling the welding current so that the electrode voltage or the difference in the integral of the electrode voltage beyond a predetermined base voltage can follow an electrode voltage curve or an electrode voltage integration curve which corresponds to the necessary rate of bead formation.

Furthermore, in order to control accurately the period of time during which the welding current is flowing therethrough, although it is possible to cut off the current after an appropriate welding time, it is possible to obtain further reliable results by cutting off the welding current at a time when the integral of the difference in electrode voltage beyond a predetermined base voltage reaches zero.

Figure 7:
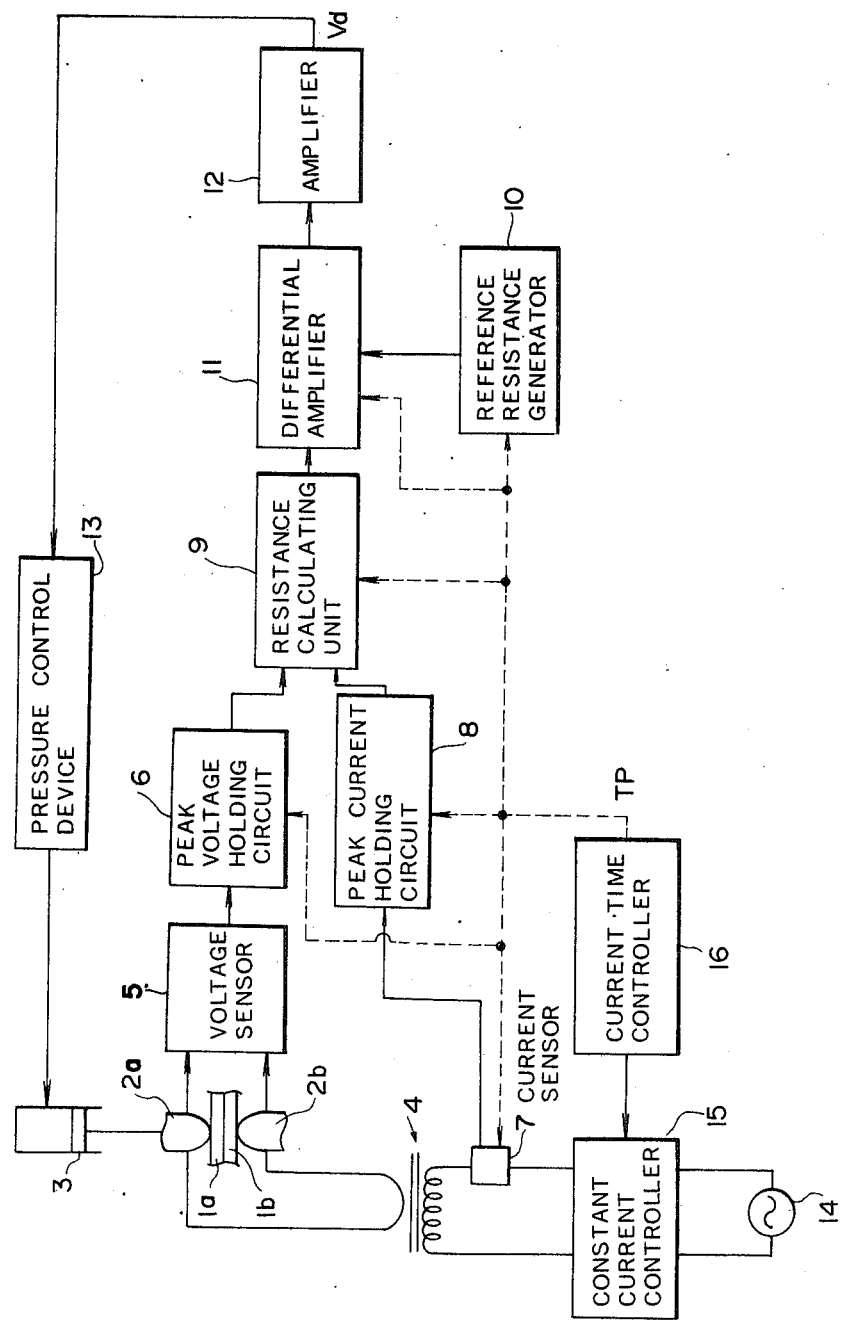
FIG. 7 is a schematic block diagram of a first embodiment according to the present invention, in which electrode pressure is controlled by detecting the welding resistance.

FIG. 7 is a schematic block diagram of a first embodiment according to the present invention. In the figure, the reference numerals 1a and 1b denote two members to be welded together such as mild steel plates, 2a denotes a movable electrode connected to a piston 3, 2b denotes a fixed electrode. In the welding process, the members to be welded 1a and 1b are pinched together under pressure and a welding current is passed therethrough from a transformer 4.

The numeral 5 denotes a voltage sensor to detect and rectify the instantaneous voltage between the electrodes 2a and 2b while the welding current is flowing therethrough (hereinbelow referred to simply as the electrode voltage) during the welding process, 6 denotes a peak voltage holding circuit which retains the detected peak value of each half-wave voltage for a half cycle or for a predetermined period of time, 7 denotes a current sensor to detect and rectify the welding current, and 8 denotes a peak current holding circuit which retains the detected peak value of each half-wave current from the current sensor 7 for a half cycle or for a predetermined period of time. The numeral 9 denotes a resistance calculating unit determining the resistance between the electrodes 2a and 2b while the welding current is flowing therethrough (hereinbelow referred to simply as the electrode resistance) by dividing the electrode voltage value retained in the peak voltage holding circuit 6 by the electrode current value retained in the peak current holding circuit 8.

The numeral 10 denotes a reference resistance generator which stores a reference resistance curve in the form of an electrode resistance function with respect to time so as to ensure a desired welding quality and which outputs reference resistance values in accordance with the function, in synchronization with a timing signal $T_p$ from a current time controller 16 described below, immediately after the welding current has been passed therethrough.

In this case, however, the term "reference resistance curve" does not necessarily limit the curve to ones which vary continuously, but includes curves which are obtained by connecting many resistance values at specific points of time. Additionally, the specific points may be a single point, for instance the initial point at which the electrode current is passed.

The numeral 11 denotes a differential amplifier which compares the voltage corresponding to the electrode resistance calculated by the resistance calculating unit 9 with the reference voltage corresponding to the electrode resistance on the reference resistance curve generated from the reference resistance generator 10, and outputs a signal corresponding to the difference between the two.

The numeral 12 denotes an amplifier amplifying the output signal from the differential amplifier 11, 13 denotes a pressure control device controlling the pressure between the electrodes 2a and 2b by actuating the piston 3 in response to the output signal from the amplifier 12.

In addition, the numeral 14 denotes an alternating power supply, 15 denotes a constant current controller to pass a predetermined constant current therethrough even when the supply voltage fluctuates. The numeral 16 denotes a current time controller which sends current start and stop signals to the constant current controller 15 in order to pass the required welding current therethrough for the required period of time. The current time controller 16 further sends out a timing signal $T_p$, for synchronization with other units after the welding current begins to flow, by way of the dashed lines shown in FIG. 7.

In this embodiment, while the welding current is flowing, the electrode resistance and a value based on the reference resistance curve are compared by the differential amplifier 11 every half-cycle or every predetermined specific time, and the pressure control device 13 is actuated in response to a signal based on the difference between the two to control the pressure applied between the electrodes 2a and 2b through the piston 3 so that the difference in electrode resistance approaches zero. That is to say, the electrode resistance decreases with increasing electrode pressure, and the electrode resistance increases with decreasing electrode pressure. Therefore, by the above-mentioned control, since the electrode resistance is controlled while the welding current is flowing so as to follow the above-mentioned reference resistance curve within an allowable range, or so as to coincide with the resistance value based on the reference resistance curve within an allowable range at least at predetermined specific points of time, it is possible to ensure an appropriate current path area between the members to be welded 1a and 1b and to obtain a desired welding quality at the weld by passing a constant current through an appropriate current path area for a required period of time.

Further in this case, according to welding conditions such as the kinds of members to be welded, it is also possible to obtain a desired welding quality by detecting the above-mentioned electrode resistance at the time at which the current begins to flow, by controlling the electrode pressure in accordance with the initial electrode resistance to ensure an appropriate current path area, and by passing a predetermined constant welding current therethrough for a required period of time.

In this case, it is possible to prevent surface flash between the electrodes 2a and 2b and the members 1a and 1b or interior flash between the members 1a and 1b, first by passing a current smaller than that necessary for the welding for one or two cycles when the current first begins to flow, next by detecting the electrode resistance during this time to control the electrode pressure so as to ensure a specified current path area, and lastly by passing a current large enough to weld the members together.

This method is, of course, effective in the case where the electrode pressure is controlled by detecting the electrode resistance while the welding current is flowing.

In the case when the electrode voltage is controlled by the electrode current, there are some problems such as that an abnormally high resistance to the initial current flow causes an erroneous operation of the control system. In such a case, it is preferable to stop the electrode voltage detection for one or two cycles initially by using a voltage sensor, before the control system is operated.

Figure 8:
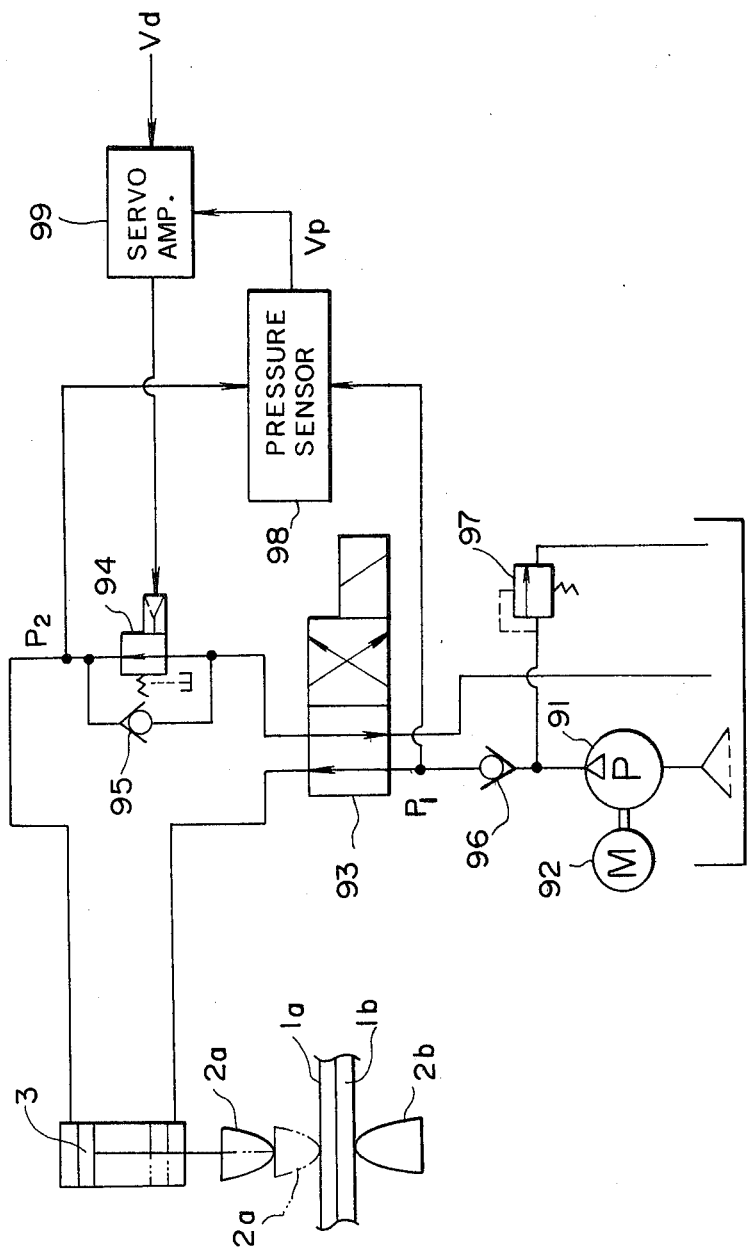
FIG. 8 is a schematic diagram of a pressure control device used with the present invention.

FIG. 8 shows a schematic diagram of the pressure control device 13 used with this embodiment of the present invention.

In this figure, the numeral 91 denotes a hydraulic pump driven by a motor 92, 93 denotes a two-way valve, 94 denotes a proportional pressure reduction valve for adjusting the pressure, 95 and 96 denote one-way valves, and 97 denotes a relief valve. In addition, the numeral 98 denotes a pressure sensor detecting the pressure applied to the piston 3 depending upon the pressure difference between the gauge ports $P_1$ and $P_2$, and the numeral 99 denotes a servo amplifier amplifying the signal controlling the proportional pressure reduction valve 94 in response to the amplified signal $V_d$ representing the output from the differential amplifier 11, using a signal $V_p$ from the pressure sensor 98 as a feedback signal.

These elements described above are connected to each other by using appropriate hydraulic pipes so as to form a hydraulic system.

In FIG. 8, if the two-way valve 93 is set so that fluid flows in the direction shown in the figure, fluid pressure is applied from the lower side of the cylinder chamber to the piston 3 to push up the movable electrode 2a; if, however, the valve 93 is switched in the other direction by a signal from a control panel (not shown), the pressure supplied by the hydraulic pump 91 is applied from the upper side of the cylinder chamber to the piston 3 through the proportional pressure reduction valve 94 to push down the movable electrode 2a, so that additional pressure is applied to the members to be welded 1a and 1b as is shown by phantom lines in FIG. 8. In this case, the additional pressure is continuously changed in response to the signal $V_d$ from the differential amplifier 8 since the proportional pressure reduction valve 94 is also controlled by the servo amplifier 99 in response to the signal $V_d$ forming a closed loop control system with the signal $V_p$ as a feedback signal.

In the case where good response characteristics are required for the pressure applied to the electrodes, it is necessary to use the above-mentioned hydraulic servo system; however, in cases where the pressure is controlled by detecting the area through which the welding current is passed depending upon the resistance between the electrode tips only at the initial current flow, since high response characteristics are not required, it is possible to use a pneumatic system provided with an air cylinder for instance.

Figure 9:
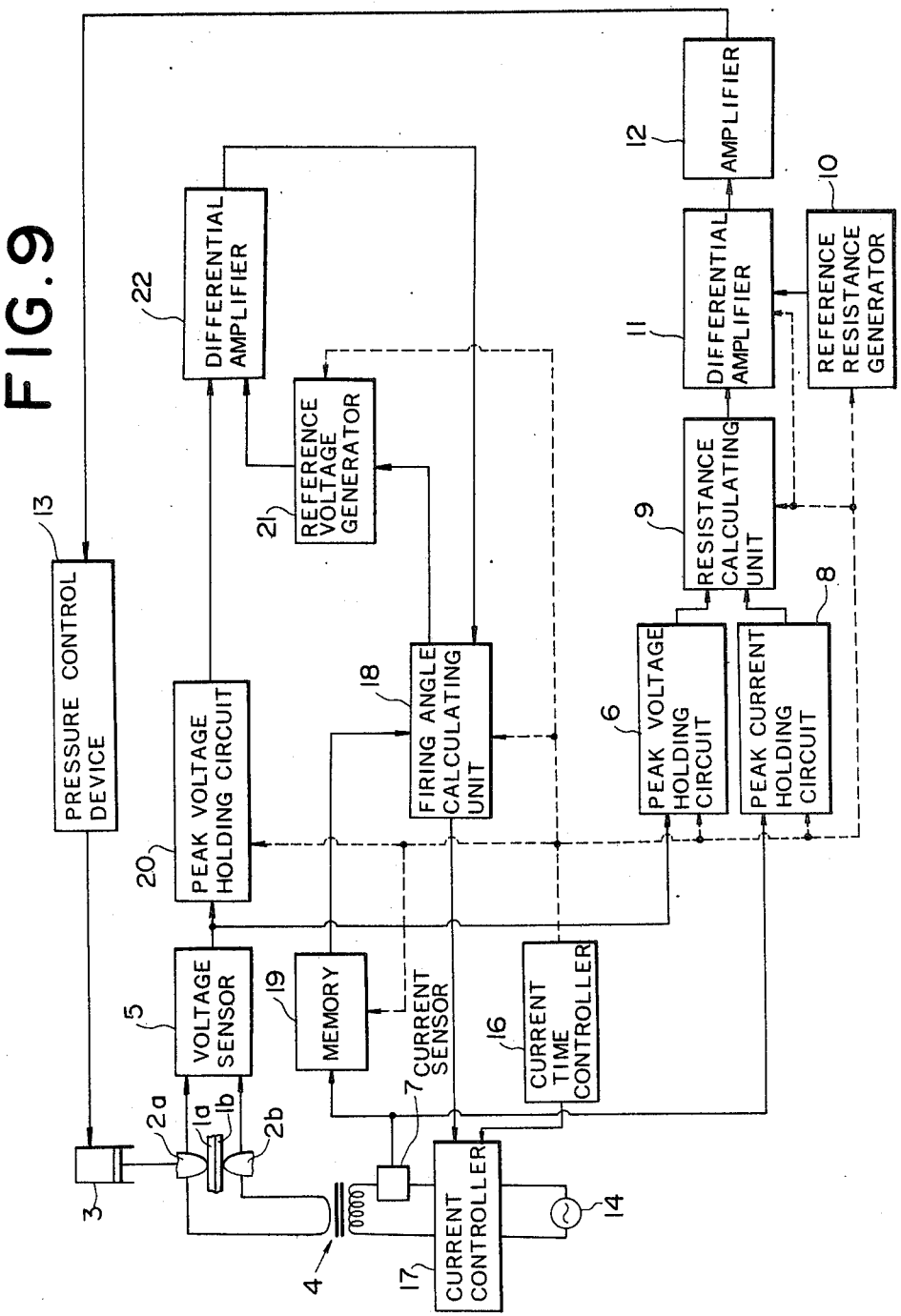
FIG. 9 is a schematic block diagram of a second embodiment according to the present invention, in which welding current is controlled by detecting the welding voltage, in addition to the control of welding pressure by detecting the welding resistance.

FIG. 9 is a schematic block diagram of a second embodiment of the present invention.

In this embodiment, not only is the electrode resistance controlled by controlling the pressure between the electrodes 2a and 2b, but also the electrode voltage is controlled by controlling the electrode current. The description following omits the portions that were included in FIG. 7.

The reference numeral 17 denotes a current controller controlling the electrode voltage, which comprises silicon control rectifiers such as thyristors, triacs and so on. The numeral 18 is a firing angle calculating unit which inputs the signal output from a differential amplifier 22 described below and the signal output from a memory 19 thereinto, executes necessary arithmetic operations, converts the calculated results into a firing phase angle control signal for a current controller 17, and outputs the control signal to the controller 17.

The memory 19 has previously stored the firing phase angles for one or two cycles of the initial electrode current flow in order to start the electrode current flowing, and actuates the peak voltage holding circuit after the one or two cycles to start the control. The actual electrode current flow is detected by a current sensor 7, and the phase angle of the preceding half-cycle current is stored every cycle.

The numeral 20 denotes a peak voltage holding circuit being the same as the peak voltage holding circuit 6, which retains the peak value of each half-wave electrode voltage detected by the voltage sensor 5 for a half-cycle or for a predetermined period.

The numeral 21 denotes a reference voltage generator which stores a reference voltage curve in the form of an electrode voltage function with respect to time so as to ensure a desirable welding quality and which outputs the reference voltage values in accordance with the function, in synchronization with a timing signal $T_p$ from a current time controller 16 immediately after the welding current has been passed therethrough.

The numeral 22 denotes a differential amplifier which compares the voltage output from the peak voltage holding circuit 20 with the voltage output from the reference voltage generator 21, and outputs a signal corresponding to the difference between the two.

In this embodiment, when the electrode current starts flowing, the calculating unit 18 outputs a firing phase angle control signal to control the current controller 17 in accordance with the initial electrode current firing phase angle stored in the memory 19, irrespective of the output signal from the differential amplifier 22. Therefore, it is possible to prevent fluctuations in the initial contact resistance and thus erroneous control operation due to abnormal electrode voltage caused by initial surface flash.

After that, the signal output from the differential amplifier 22 and the preceding half-cycle firing phase angle data stored in the memory 19 are both inputted to the firing angle calculating unit 18, and the firing phase angle signal is changed so that the electrode current is controlled in such a way that the output of the differential amplifier 22 becomes zero. Accordingly, the current controller 17 changes the electrode current in such a way that the electrode voltage increases when the electrode current increases or decreases when the current decreases.

Hereupon, even when the temperature distribution in a member to be welded is the same, the electrode voltage changes when the firing phase angle of the welding current changes. Therefore it is necessary to correct the reference voltage curve stored in the reference voltage generator 21 according to the firing phase angle. For this reason, the firing phase angle of the actual welding current stored in the memory 19 is transferred to the reference signal generator 21 through the firing angle calculating unit 18 in order to correct the reference voltage curve based on the phase angle.

In addition to the control of electrode voltage based on the control of welding current, the electrode resistance is detected in the same way as in the first embodiment, and thereby the electrode pressure is controlled.

As described above, since the welding current and the electrode pressure are both controlled so that the electrode voltage changes in accordance with the reference voltage curve and also the electrode resistance changes in accordance with the reference resistance curve, it is possible to obtain excellent welding quality at the desired positions.

Further, by using the embodiment according to the present invention, it is possible to widen the controllable range and an appropriate control is available at all times according to the condition of the members to be welded, in cases where the contact conditions at the resistance weld, especially between the electrodes 2a and 2b and the members 1a and 1b or between the members 1a and 1b are subject to change, for instance where welding is applied to parts made in pressing processes or parts made of high tension steel plate.

Further, since the current path area between the electrodes and the members to be welded or between the members is automatically regulated when the electrode tips are crushed, it is possible to prevent excessively large beads from being formed and excessive energy from being consumed.

It has been described hereinabove that the electrode resistances are instantaneously detected, the detected electrode resistances are compared with the reference resistance curve, and the electrode pressure is controlled in accordance with the difference in value. However, it is also possible to detect the electrode resistance only at the initial current flow or at specific points of time, for instance at the start, the middle, and the second half-cycle of the current flow to control the electrode pressure in accordance with the difference in the electrode resistance from the reference resistance value at those respective points of time.

In general, when a hydraulic servo system is used for the control of electrode pressure, it is possible to obtain a response of about 50 Hz. When the electrode pressure is controlled at specific points of time, for instance at the start, middle, and the second half-cycle of the current flow, however, it is possible to use a pneumatic electrode pressure servo system which is slower in response compared to the hydraulic system.

Figure 10:
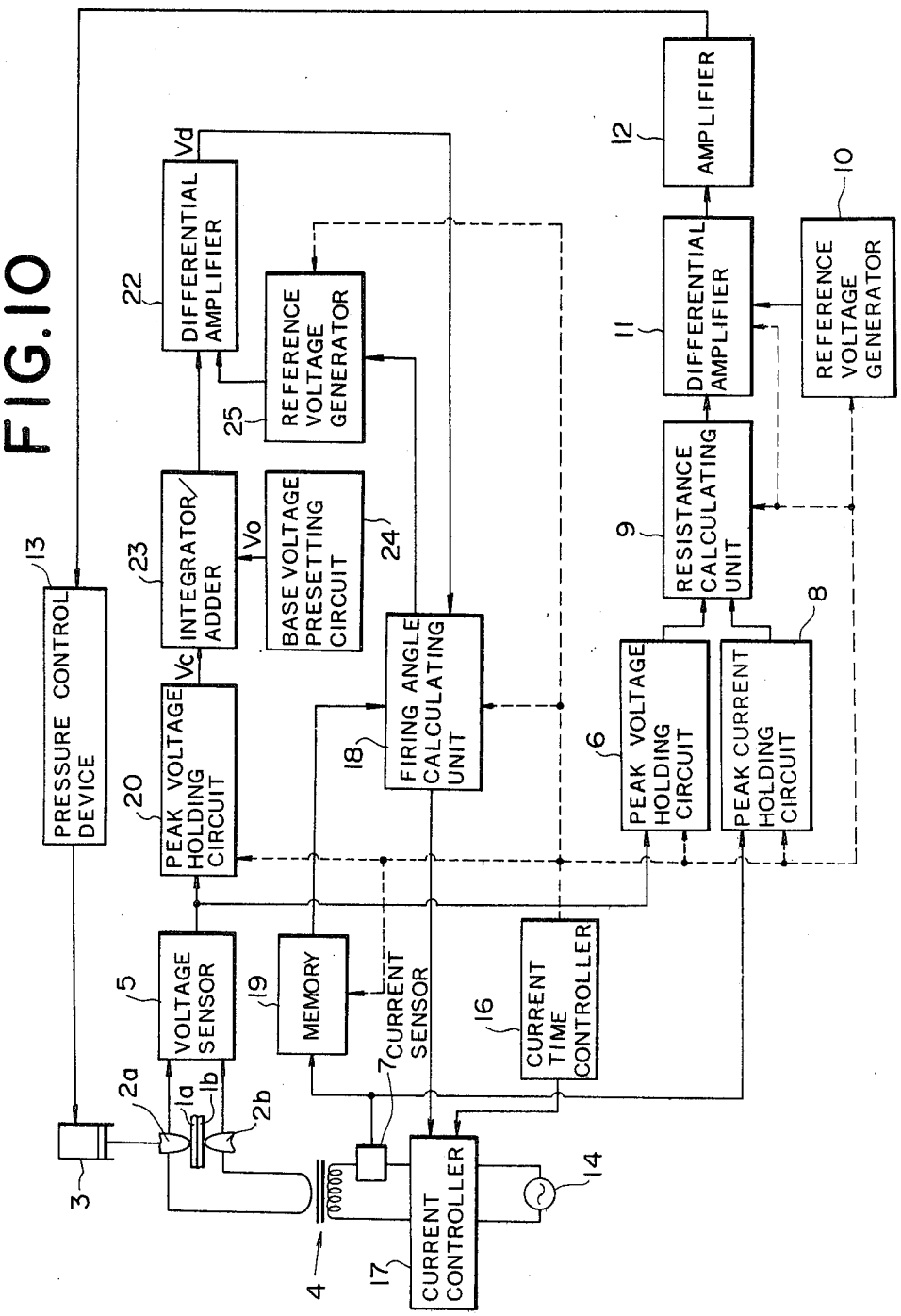
FIG. 10 is a schematic block diagram of a third embodiment according to the present invention, in which welding current is controlled by detecting the welding voltage and by integrating the difference in voltage between the detected value above a predetermined base voltage and the predetermined base voltage, in addition to the control of welding pressure by detecting the welding resistance.

FIG. 10 shows a schematic block diagram of a third embodiment of the present invention. The points different from the embodiment in FIG. 9 are that an integrator/adder 23, and a base voltage presetting circuit 24 are provided, and a reference voltage integration curve is stored in a reference voltage generator 25 to ensure a preferable welding quality by outputting the reference voltage integral at each specific time.

In this embodiment, only when the maximum value $V_c$ of each half-wave electrode voltage outputted from the peak voltage holding circuit 20 exceeds the base voltage $V_o$ preset by the base voltage presetting circuit 24, does the integrator/adder 23 integrate or add the difference in voltages $(V_c - V_o)$. The integral outputted from the integrator/adder 23 is compared with the reference voltage integral outputted from the reference voltage generator 25 in the differential amplifier 22, and the signal $V_d$ based on the difference is inputted to the calculating unit 18 in order to control the electrode current in the same manner as in the embodiment of FIG. 9. Therefore, even if the above-mentioned integral deviates from the reference voltage integration curve, it is possible to correct it within the next half-cycle in accordance with the reference voltage integration curve. By using this method, it is possible to ensure good welding quality when the voltage fluctuates.

Figure 11:
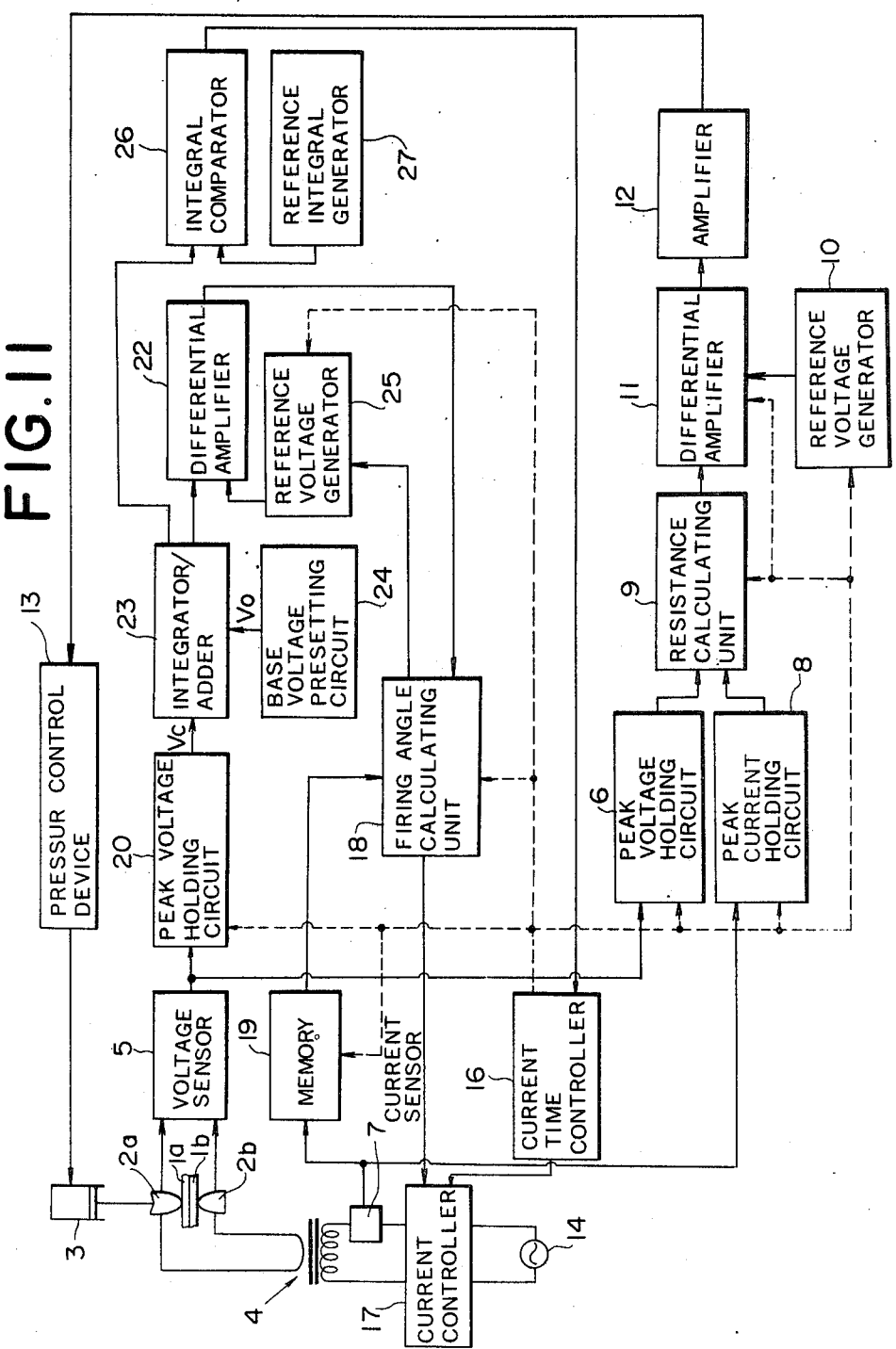
FIG. 11 is a schematic block diagram of a fourth embodiment according to the present invention based on the third embodiment of FIG. 10, in which the welding current is cut off when the integral of the difference in voltage between the detected value and the reference value reaches a value based on a reference voltage integration curve.

FIG. 11 shows a schematic block diagram of a fourth embodiment of the present invention. The points different from the embodiment in FIG. 10 are that an integral comparator 26 and a reference integral generator 27 are provided.

The integral comparator 26 compares the integral outputted from the integrator/adder 23 (the integral of the difference in voltage $(V_c - V_o)$ when the electrode voltage $V_c$ exceeds the base voltage $V_o$) with the integral outputted from the reference preset integral generator 27 so as to ensure a desired welding quality. When the integral difference $(V_c - V_o)$ becomes zero, the integral comparator 26 sends a signal to the current time controller 16 to cut off the welding current.

In this embodiment, since the period during which the welding current is flowing is automatically controlled to an appropriate period at all times, it is possible to obtain a more preferable quality at the weld.

Further, when an electrode tip is crushed and therefore the current path between the electrodes and the members to be welded or between the members is excessively increased, the necessary welding current increases in order to make the electrode voltage coincide with the reference voltage or the reference voltage integral, however in this case, the welder cannot supply the necessary current beyond the current capacity.

Therefore, it is preferable to detect the difference between the maximum welding current which the welder can supply and the required welding current and to output a signal, when there is no difference between the two, in order to stop the control operations of the system or to display or warn of the abnormal situation.

Figure 12:
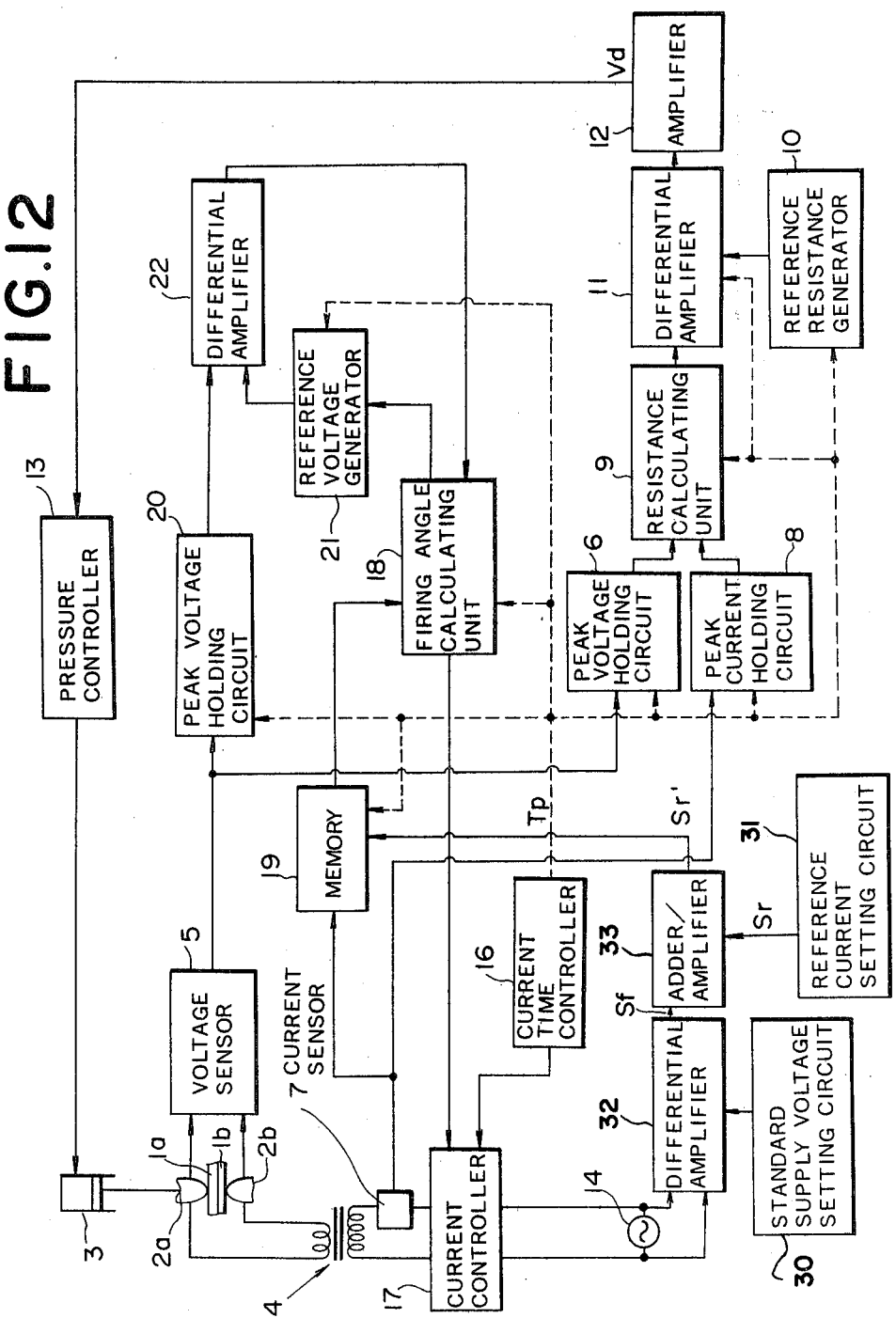
FIG. 12 is a schematic block diagram of a fifth embodiment according to the present invention based on the second embodiment of FIG. 9, in which the welding power supply voltage is controlled at a constant level.

FIG. 12 is a schematic block diagram showing a fifth embodiment according to the present invention.

The basic embodiment of this figure is that shown in FIG. 9. That is to say, a reference welding current control system is provided for the embodiment of FIG. 9.

The numeral 30 denotes a standard welding supply voltage setting circuit presetting the standard welding supply voltage, while 31 denotes a reference welding current setting circuit presetting the reference welding current value to be passed therethrough as the welding current when the welding power supply voltage is set to the standard voltage thereof.

The differential amplifier 32 compares the welding power supply voltage from an alternating current power source 14 with the standard welding supply voltage preset by the standard welding current setting circuit 23, and sends out a positive or negative signal $S_f$ to an adder/amplifier 33 according to the difference between the two.

The adder/amplifier 33 adds this signal $S_f$ and another signal $S_r$ from the reference welding current setting circuit 31 to pass a reference welding current, amplifies the result as a signal $S_r'$, and sends it to a memory 19.

In accordance with the signal $S_r'$, the memory sends to the calculating unit 18 the data to determine the firing phase angle of the silicon control rectifiers in the welding current controller 15 so that the reference welding current can flow one or two cycles after the current begins to flow.

When no signal is sent from the differential amplifier 22, the calculating unit 18 calculates a necessary firing phase angle depending only upon the data from the memory 19 and outputs a firing phase angle control signal to control the current controller 17.

By this, the reference welding current flows through the primary side of a transformer 4. Therefore, even if the welding supply voltage fluctuates, since the signal $S_r$ to pass the reference welding current is corrected in accordance with the output signal $S_f$ from the differential amplifier 32, it is possible to retain the reference welding voltage at a constant level.

Figure 13:
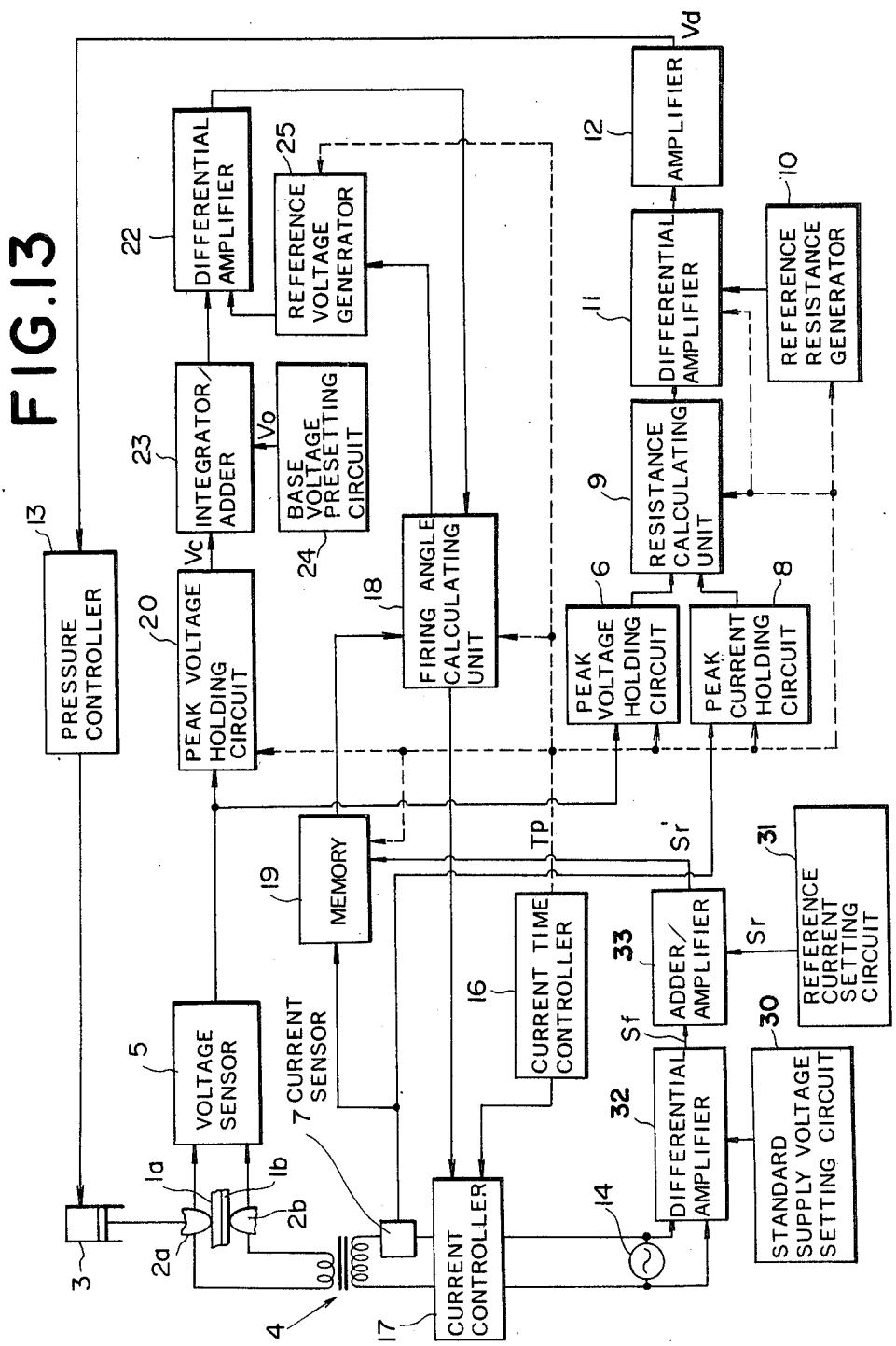
FIG. 13 is a schematic block diagram of a sixth embodiment according to the present invention based on the third embodiment of FIG. 10, in which the welding power supply voltage is controlled at a constant level.

FIG. 13 shows a schematic block diagram of a sixth embodiment of the present invention. The points different from the embodiment in FIG. 12 are that an integrator/adder 23, and a base voltage presetting circuit 24 are provided, and a reference voltage integration curve is stored in a reference voltage generator 25 to ensure a preferable welding quality by outputting the reference voltage integral at each point of time.

In this embodiment, only when the maximum value $V_c$ of each half-wave electrode voltage outputted from the peak voltage holding circuit 20 exceeds the base voltage $V_o$ preset by the base voltage presetting circuit 24, does the integrator/adder 23 integrate or add the difference in the voltages $(V_c - V_o)$. The integral outputted from the integrator/adder 23 is compared with the reference voltage integral outputted from the reference voltage generator 25 in the differential amplifier 22, and the signal $V_d$ based on the difference is inputted to the calculating unit 18 in order to control the electrode current in the same manner as in the embodiment of FIG. 12. Therefore, even if the above-mentioned integral deviates from the reference voltage integration curve, it is possible to correct it within the next half-cycle in accordance with the reference voltage integration curve. By using this method, it is possible to ensure remarkably good welding quality when the voltage fluctuates.

Figure 14:
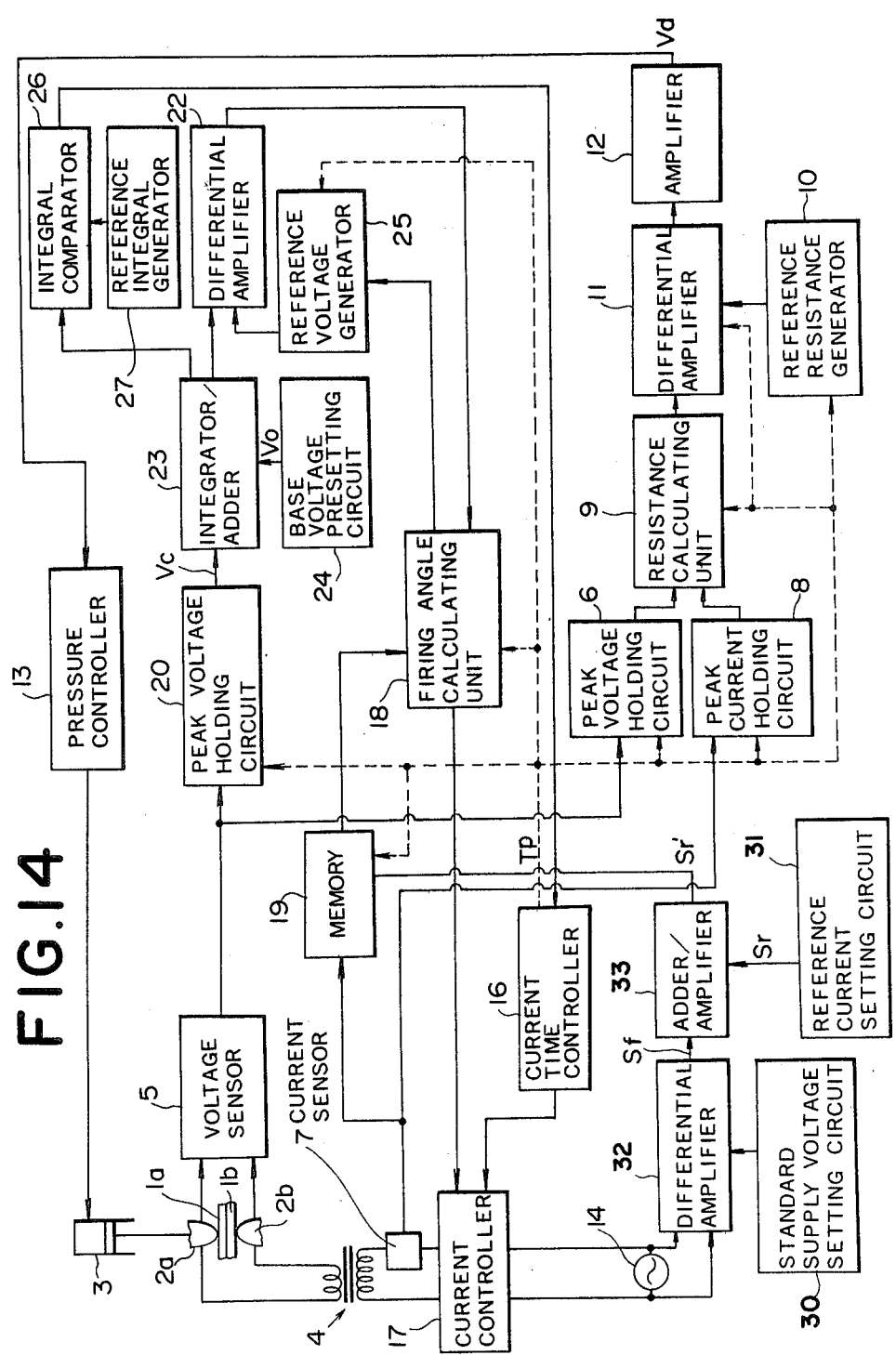
FIG. 14 is a schematic block diagram of a seventh embodiment according to the present invention based on the fourth embodiment of FIG. 11, in which the welding power supply voltage is controlled at a constant level.

FIG. 14 shows a schematic block diagram of a seventh embodiment of the present invention. The points different from the embodiment in FIG. 13 are that an integral comparator 26 and a reference preset integal generator 27 are provided as described with respect to FIG. 11.

The integral comparator 26 compares the integral outputted from the integrator/adder 23 (the integral of the difference in voltage $(V_c - V_o)$ when the electrode voltage $V_c$ exceeds the base voltage $V_o$) with the integral outputted from the reference integral generator 27 so as to ensure a desired welding quality. When the integral difference $(V_c - V_o)$ becomes zero, the integral comparator 26 sends a signal to the current time controller 16 to cut off the welding current.

In this embodiment, since the period during which the welding current is flowing is automatically controlled to be an appropriate period at all times, it is possible to obtain a more preferable quality of the weld.

Further, when an electrode tip is crushed and therefore the current path area between the electrodes and the members to be welded or between the members is excessively increased, the necessary welding current increases in order to make the electrode voltage coincide with the reference voltage or the reference voltage integral, however in this case the welder cannot supply the current beyond its capacity.

Therefore, it is preferable to detect the difference between the maximum welding current which the welder can supply and the necessary welding current and to output a signal, when there is no difference between the two, in order to stop the control operations of the system or to display or warn of the abnormal situation.

Figure 15:
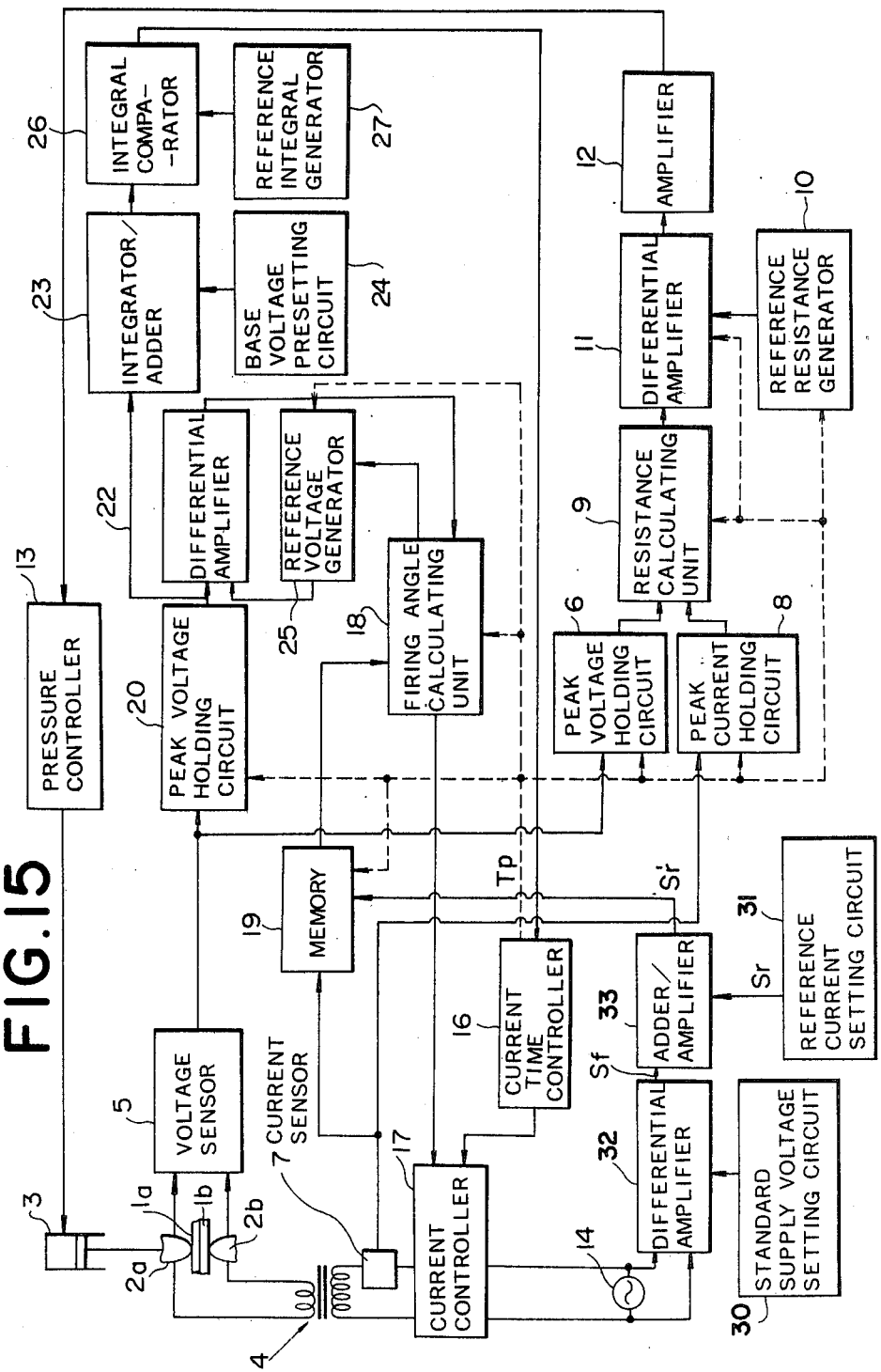
FIG. 15 is a schematic block diagram of an eighth embodiment according to the present invention, which is almost the same as that of FIG. 14.

FIG. 15 shows a schematic block diagram of a eighth embodiment of the present invention. In this embodiment, an integrator/adder 23, a base voltage generator 24, an integral comparator 26, and a reference integral generator 27 are provided with the embodiment of FIG. 12. The operations and the effects of FIG. 15 are almost the same as those of FIG. 14, and therefore the description of this embodiment is omitted herein.

In spot welding, the shape of the electrode tip influences the relationship between the electrode pressure and the current path area, especially its proportional constant. In general, tips of various shapes are usable, however, round-shaped or dome-shaped tips are preferable from the standpoint of control of current path area by the control of the electrode pressure.

In this embodiment, although the difference in voltage is calculated, when the electrode tip voltage deviates from the reference voltage, and the welding current is controlled so as to eliminate the difference, the electrode current is generally controlled by changing the firing angle of the thyristors provided in the electrode current controller.

The relation between the difference in voltage and the thyristor firing angle is preset under consideration of the response speed of the control system. When the power supply voltage is kept constant, it is unnecessary to control this relationship. However, in cases where the supply voltage varies widely with time, for instance when the system is used in a factory, it is sometimes difficult to control the electrode current so as to eliminate the difference in voltage without changing the firing angle of the thyristors.

Therefore, when the supply voltage varies, it is possible to ensure good welding quality effectively by changing the relationship between the difference in voltage and the firing angle according to changes in the supply voltage.

The electrode current is usually detected at the primary side of the welding transformer 4, however it is preferable to detect the electrode current at the secondary side in the case of multispot welding or serial spot welding.

In the above embodiments, the operations have been described in the case where alternating current power supply is used with a sampled-data control method by selecting the half-wave peak values as the representative points; however, it is also possible to use direct current power supply in a continuous control method.

In addition, the operations have been explained applied to spot welding, but it is also possible to apply this invention to other resistance welding such as projection welding, seam welding, flash welding, upset butt welding, etc., as will be easily understood by those skilled in the art.

Furthermore, in the case where a number of electrodes are used in a single welder, such as in multispot welding or serial spot welding, it is possible to control the respective quality at the respective weld according to the need, by controlling the respective electrode pressures at each welding point depending upon the detection of the respective electrode resistance.

As explained above, according to the method and system of the present invention since the pressure between the two electrodes between which members to be welded are pinched or the welding pressure and the welding current are both controlled during the welding process so as to obtain a desired stable quality, it is possible to do away with the repairs of welded parts, and to reduce greatly the ratio of defective weldments without wasting parts or weldments, with the result that welding productivity is considerably improved.

Further, since the pressure control between the electrodes is especially effective for the prevention of surface flash or burring at the weld, it is possible to improve the safety and appearance of weldments.

Furthermore, since the integral of the difference in voltage between the electrodes which exceeds a base voltage can be controlled so as to follow a reference voltage integration curve (a curve necessary to obtain a stable good welding quality), it is possible to ensure good welding quality even in cases where the supply voltage fluctuates considerably.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of dually controlling resistance welding, which comprise the steps of:
   (a) detecting electrode resistance between welding electrodes between which members to be welded are pinched;
   (b) comparing the detected electrode resistance with a reference electrode resistance based on a predetermined reference electrode resistance curve;
   (c) controlling the electrode pressure applied to the welding electrodes in accordance with the difference in electrode resistance between the detected value and the reference value so that the detected electrode resistance coincides with the reference electrode resistance based on the reference electrode resistance curve;
   (d) detecting electrode welding voltage between the welding electrodes between which members to be welded are pinched;
   (e) comparing the detected electrode voltage with a reference electrode voltage based on a predetermined reference electrode voltage curve; and,
   (f) controlling electrode current passed between the welding electrodes in accordance with the difference in electrode voltage between the detected electrode voltage value and the reference electrode voltage value so that the detected electrode voltage coincides with the reference electrode voltage based on the reference electrode voltage curve,
   whereby the electrode current is controlled by detecting the electrode voltage, in addition to the control of the electrode pressure by detecting the electrode resistance.

2. A method of controlling resistance welding as set forth in claim 1, which further comprises the steps of:
   (a) detecting the electrode voltage between the welding electrodes between which members to be welded are pinched;
   (b) integrating the difference in electrode voltage between the detected value in excess of a predetermined base electrode voltage and the predetermined base electrode voltage;
   (c) comparing the integrated electrode voltage with the integral based on a predetermined reference electrode voltage integration curve; and
   (d) controlling the electrode current passed between the welding electrodes in accordance with the difference in electrode voltage integral between the detected value and the reference value so that the detected electrode voltage integral coincides with the reference electrode voltage integral based on the reference electrode voltage integration curve,
   whereby electrode current is controlled by detecting electrode voltage and by integrating the difference in electrode voltage, in addition to the control of electrode pressure by detecting electrode resistance, to obtain a good welding quality especially when the supply voltage fluctuates.

3. A method of controlling resistance welding as set forth in claim 2, which further comprises a step of cutting off the electrode current when the difference in the electrode voltage integral between the detected value and the reference value reaches the electrode voltage integral based on the reference electrode voltage integration curve,
   whereby an optimum welding period is automatically controlled.

4. A method of controlling resistance welding as set forth in any of claims 1, 2, and 3 which further comprises the steps of:
   (a) comparing the welding power supply voltage with a standard welding power supply voltage; and
   (b) controlling the firing phase angle signal applied to an electrode current phase controller in accordance with the difference in supply voltage between the actual value and the reference value,
   whereby the reference electrode current is kept constant, even if the welding power supply voltage fluctuates.

5. A method of controlling resistance welding as set forth in claim 4 which further comprises the steps of:
   (a) comparing the instantaneous electrode current with the maximum possible electrode current;
   (b) outputting a signal when the difference between the two reaches zero;
   (c) stopping the welding current in response to the signal, and
   (d) displaying the abnormal condition in response to the signal.

6. A method of controlling resistance welding as set forth in claim 5, wherein the abnormal condition is indicated by an alarm.

7. A method of controlling resistance welding as set forth in claim 2, wherein the reference electrode voltage integration curve with respect to time is a continuously changing curve.

8. A method of controlling resistance welding as set forth in claim 2, wherein the reference electrode voltage integration curve with respect to time is a curve formed by a plurality of broken lines.

9. A method of controlling resistance welding as set forth in claim 2, wherein the reference electrode voltage integration curve with respect to time is represented only by a specific point.

10. A method of dually controlling resistance welding as set forth in claim 1 comprising the further steps of passing an initial electrode current smaller than that required for the welding between the electrodes for one or two cycles before the steps of detecting the electrode resistance, comparing the detected electrode resistance with the reference value and controlling the electrode pressure so as to obtain a predetermined electrode current path area, and next passing a constant electrode current therethrough,
   whereby it is possible to prevent surface flash from being generated between the electrode and the members to be welded or between the members to be welded.

11. A method of dually controlling resistance welding as set forth in claim 1 wherein the electrode voltage and the electrode current are detected under a sampled-data control system based on an alternating current power supply.

12. A method of dually controlling resistance welding as set forth in claim 1 wherein the electrode voltage and the electrode current are detected under a continuous control based on a direct current power supply.

13. A method of dually controlling resistance welding as set forth in claim 1, wherein the electrode voltage and the electrode current are detected at the half-cycle peak value positions of the alternating signal.

14. A method of dually controlling resistance welding as set forth in claim 1, wherein the detected electrode resistance is compared with the reference electrode resistance based on a reference electrode resistance curve every half cycle.

15. A method of dually controlling resistance welding as set forth in claim 1, wherein the detected electrode resistance is compared with the reference electrode resistance based on a reference electrode resistance curve at the time when the welding current, starts to flow.

16. A method of dually controlling resistance welding as set forth in claim 1, wherein the detected electrode resistance is compared with the reference electrode resistance based on a reference electrode resistance curve at some intermediate time while the welding current is flowing.

17. A method of dually controlling resistance welding as set forth in claim 1, wherein the detected electrode resistance is compared with the reference electrode resistance based on a reference electrode resistance curve at the end of the time during which the welding current is flowing.

18. A method of dually controlling resistance welding as set forth in claim 1, wherein the electrode current is controlled by changing the firing angle of a thyristor.

19. A method for dually controlling resistance welding as recited in claim 18, comprising the further step of calculating said firing angle as a function of the difference in electrode voltage between the detected and the reference electrode voltages.

20. A method of dually controlling resistance welding as set forth in claim 1, wherein the reference electrode resistance curve is a continuously changing curve with respect to time.

21. A method of dually controlling resistance welding as set forth in claim 1, wherein the reference electrode resistance curve is a curve formed by a plurality of lines forming a piecewise linear curve with respect to time.

22. A method of dually controlling resistance welding as set forth in claim 17, wherein the reference electrode resistance curve with respect to time is represented only by a specific point.

23. A method of dually controlling resistance welding as set forth in claim 1, wherein the reference electrode voltage curve is a continuously changing curve with respect to time.

24. A method of dually controlling resistance welding as set forth in claim 1, wherein the welding electrode voltage curve is a curve formed by a plurality of lines forming a piecewise linear curve with respect to time.

25. A method of controlling resistance welding as set forth in claim 1, wherein the welding electrode voltage curve with respect to time is represented only by a specific point.

26. A system for dually controlling resistance welding, which comprises:
(a) a voltage sensor for detecting an electrode voltage between welding electrodes between which members to be welded are pinched while a welding current is flowing between the welding electrodes;
(b) a current sensor for detecting the electrode current flowing between the welding electrodes;
(c) a resistance calculating unit for calculating electrode resistance depending upon the electrode voltage detected by said voltage sensor and upon the electrode current detected by said current sensor;
(d) a reference resistance generator for generating a reference electrode resistance based on a reference curve representing a function of resistance with respect to welding time;
(e) a differential amplifier for comparing the electrode resistance calculated by said resistance calculating unit with the reference electrode resistance based on the reference resistance curve and for outputting a control signal in response to the difference between the two;
(f) a pressure control device for controlling the electrode pressure applied to the welding electrodes in accordance with the signal from said differential amplifier;
(g) a reference voltage generator for generating predetermined reference voltages based on a reference curve representing a function of voltage with respect to welding time;
(h) a second differential amplifier for comparing the voltage detected by said voltage sensor with the reference voltage based on the reference voltage curve and for outputting a control signal in response to the difference between the two voltages;
(i) a memory for storing predetermined initial firing phase angle data to start flow of electrode current and for outputting the electrode current value detected by said current sensor after an initial period;
(j) a firing angle calculating unit for calculating a firing phase depending upon the output signals from said second differential amplifier and from said memory and for converting the calculated result into a firing phase angle control signal; and,
(k) a current controller for controlling the electrode current in response to the firing phase angle control signal from said firing angle calculating unit, said current controller including silicon controlling rectifiers,
whereby the electrode current is controlled by detecting the electrode voltage, in addition to the control of the electrode pressure by detecting the electrode resistance.

27. A system for dually controlling resistance welding as set forth in claim 26, which further comprises:
(a) a peak voltage holding circuit for holding each detected half-wave peak value of the voltage for a half cycle, disposed between said voltage sensor and said resistance calculating unit;
(b) a peak current holding circuit for holding each detected half-wave peak value of the current for a half cycle, disposed between said current sensor and said resistance calculating unit;
(c) a constant current controller for holding the electrode current flowing through the electrodes at a constant current value; and
(d) a current time controller for outputting start-stop signals to said constant current controller and for outputting a timing signal $T_p$ for synchronization with said reference resistance generator, said differential amplifier, said resistance calculating unit, said peak current holding circuit, said peak voltage holding circuit and said current sensor, whereby the system is controlled by synchronization with the timing signal $T_p$, and a constant current is passed therethrough for a fixed period of time.

28. A system for dually controlling resistance welding as set forth in claim 26, wherein said pressure control device comprises:
(a) a piston unit having upper and lower chambers for applying electrode pressure to a movable electrode;
(b) a proportional pressure reduction valve for adjusting the electrode pressure applied to an upper chamber of said piston;
(c) a servo amplifier for amplifying the signal from said differential amplifier and for outputting the amplified control signal to said proportional pressure reduction valve; and
(d) a pressure sensor for determining the pressure applied to said piston unit from the pressure difference between the upper and lower chambes of said piston unit for outputting a feedback signal $V_p$ to said servo amplifier in response to the detected pressure difference, whereby said pressure control device is controlled by a feedback loop.

29. A system for dually controlling resistance welding as set forth in claim 26, which further comprises a current time controller for outputting start-stop signals to said current controller and for outputting a timing signal for synchronization with said respective elements.

30. A system for controlling resistance welding as set forth in claim 29, which further comprises:
(a) a base voltage presetting circuit for presetting a desired base voltage $V_o$; and
(b) an integrator for integrating the difference between the voltage $V_c$ detected by said voltage sensor and the base voltage $V_o$ preset in said base voltage presetting circuit with respect to welding time, under a continuous control based on a direct current power supply, only when the detected voltage $V_c$ exceeds the base voltage $V_o$, whereby the welding voltage between the electrodes is controlled in accordance with a reference voltage integration curve preset in said reference voltage generator, instead of a reference voltage curve, so as to obtain a stable welding quality even if the supply voltage fluctuates.

31. A system for controlling resistance welding as set forth in claim 30, wherein said integrator is an adder for adding the difference between the voltage $V_c$ detected by said voltage sensor and the base voltage $V_o$ preset in said base voltage presetting circuit with respect to welding time, under a sampled-data control system based on an alternating current power supply, only when the detected voltage $V_c$ exceeds the base voltage $V_o$, in the case where the voltage is detected, whereby the welding voltage between the electrodes is controlled in accordance with a reference voltage addition curve preset in said reference voltage generator, instead of a reference voltage curve, so as to obtain a stable welding quality even if the supply voltage fluctuates.

32. A system for controlling resistance welding as set forth in claim 30, which further comprises:
(a) a reference integral generator for generating the reference electrode voltage integral based on a reference electrode voltage integration curve predetermined so as to obtain a desired welding quality;
(b) an integral comparator for comparing the integral outputted from said integrator with the integral outputted from said reference integral generator and for outputting a signal into said current time controller to cut off the electrode current only when the two integrals coincide with each other, whereby an optimum welding period is automatically controlled.

33. A system for controlling resistance welding as set forth in any of claims 26, 30, 31, and 32 which further comprises:
(a) a standard supply voltage setting circuit for presetting the standard supply voltage;
(b) a reference current setting circuit for presetting the reference electrode current passed therethrough when the welding supply voltage is standard and for outputting a signal $S_r$;
(c) a third differential amplifier for comparing the actual power supply voltage with the standard supply voltage preset by said standard supply voltage setting circuit to output a positive or negative signal $S_f$ in accordance with the difference between the two; and
(d) an adder amplifier for adding the signal $S_f$ outputted from said third differential amplifier to the signal $S_r$ outputted from said reference current setting circuit and for outputting a signal $S_r'$ to said memory in order to correcting the data fed into said firing angle calculating unit so that the firing phase angle of said current controller can be determined on order to pass the standard electrode current, after the fixed initial electrode current control has been achieved, whereby the reference electrode current is kept constant, even if the welding power supply voltage fluctuates.

34. A system for dually controlling resistance welding as set forth in claim 26, wherein said memory stores data representing initial firing phase angle date for one cycle of the initial period.

35. A system for dually controlling resistance welding as set forth in claim 26, wherein said memory stores data representing initial firing phase angles for two cycles of the initial period.

36. A system for dually controlling resistance welding as set forth in claim 26 wherein the reference electrode voltage curve stored in said reference voltage generator is corrected according to the rate of firing phase angles calculated by said firing angle calculating unit.

37. A system for dually controlling resistance welding as recited in claim 26 further comprising means for varying the reference voltage generated by said reference voltage generator responsively to a phase firing angle.

38. A system for dually controlling resistance welding as recited in claim 37 further comprising a memory means for storing the phase firing angle calculated in a first operating cycle for use in a succeeding operating cycle and for supplying the stored phase firing angle in the succeeding cycle to vary the reference voltage generated by said reference voltage generator.

39. A method for dually controlling resistance welding, comprising the steps of:

(a) detecting an electrode voltage between welding electrodes between which members to be welded are pinched while a welding current is flowing between the welding electrodes;

(b) detecting the electrode current flowing between the welding electrodes;

(c) calculating a resistance indicator as a function of the detected electrode voltage and current;

(d) generating a reference quantity as a function of welding time;

(e) comparing the resistance indicator with the reference quantity and outputting a first control signal representative of the difference therebetween;

(f) controlling pressure applied to the welding electrodes in accordance with said first control signal;

(g) generating a predetermined reference voltage quantity as a function of time;

(h) comparing the detected electrode voltage with said predetermined reference voltage and outputting a second control signal responsive to the difference therebetween;

(i) calculating a firing phase angle as a function of said second control signal; and (j) controlling the electrode current in accordance with said calculated firing phase angle by triggering a controlled conducting device to conduct at said firing phase angle.

40. A method for dually controlling resistance welding as recited in claim 39, comprising the further step of reducing errors due to initial surface flashing by storing initial firing phase angle data for a number of initial cycles of operation, and providing said stored data for controlling the electrode current in accordance therewith during said number of initial cycles of operation.

41. A method for dually controlling resistance welding as recited in claim 39, comprising the further step of storing the calculated firing phase angle of a first cycle of operation for use in a succeeding cycle of operation, and varying the generated reference voltage quantity in said succeeding cycle as a function of a change in firing phase angle from the stored value.

* * * * *